United States Patent
White

(10) Patent No.: US 6,907,441 B2
(45) Date of Patent: *Jun. 14, 2005

(54) SQUARE ROOT EXTRACTOR

(75) Inventor: Stanley A. White, San Clemente, CA (US)

(73) Assignee: Honeywell International, Inc., Morristown, NJ (US)

( * ) Notice: Subject to any disclaimer, the term of this patent is extended or adjusted under 35 U.S.C. 154(b) by 671 days.

This patent is subject to a terminal disclaimer.

(21) Appl. No.: 09/928,529

(22) Filed: Aug. 13, 2001

(65) Prior Publication Data

US 2003/0033341 A1 Feb. 13, 2003

(51) Int. Cl.$^7$ ................................................. G06F 7/38
(52) U.S. Cl. ..................................................... 708/605
(58) Field of Search ................................ 708/500, 605, 708/510

(56) References Cited

U.S. PATENT DOCUMENTS

| | | | |
|---|---|---|---|
| 4,949,296 A | * 8/1990 | Malinowski | ................ 708/605 |
| 5,216,628 A | * 6/1993 | Mizutani et al. | ............ 708/201 |
| 5,268,857 A | 12/1993 | Chen et al. | |
| 5,818,743 A | * 10/1998 | Lee et al. | ................... 708/628 |
| 6,143,583 A | 11/2000 | Hays | |
| 6,223,194 B1 | * 4/2001 | Koike | ........................ 708/322 |
| 6,250,156 B1 | 6/2001 | Seshia et al. | |

OTHER PUBLICATIONS

Chapter 21, "Square–Rooting Methods", XP–002253877, pp. 345–357, 2000.

Kenneth W. Martin, "Power Normalized Update Algorithm for Adaptive Filters–Without Divisions", IEEE Transactions on Acoustics, Speech, and Signal Processing, vol. 37, No. 11, Nov. 1989, pp. 1782–1786.

* cited by examiner

Primary Examiner—Chuong Dinh Ngo
(74) Attorney, Agent, or Firm—Schiff Hardin LLP

(57) ABSTRACT

A square root extractor includes only multipliers, summers, delay elements, and a scaler so that the square root of a signal may be produced without complex computations.

20 Claims, 2 Drawing Sheets

SQUARE ROOT EXTRACTOR

TECHNICAL FIELD OF THE INVENTION

The present invention relates in general to an arrangement for producing an output signal which is the square root of an input signal.

BACKGROUND OF THE INVENTION

A wide variety of applications require the use of a square root extractor. For example, at least some electric-force-balance instruments are non-linear devices used to measure various physical phenomena. Such instruments typically develop an internal restoring force which is proportional to the square of an applied analog control signal. The analog control signal is usually provided by a digital controller, which supplies a digital command signal, and a digital-to-analog converter (DAC), which converts the digital command signal to an analog command signal. This analog command signal is supplied to a driver which provides the analog control signal to the electric-force-balance instrument.

As suggested by the above, the response of the electric-force-balance instrument varies as the square of the amplitude of the control signal. Accordingly, the response of the electric-force-balance instrument is non-linear with respect to its input control signal. Because of this non-linearity, linear control algorithms cannot be used directly to control the electric-force-balance instrument. Instead, such linear control algorithms must incorporate additional processing which linearizes the response of the instrument, thereby adding extra cost and complexity to the electric-force-balance instrument.

The present invention, therefore, is directed to an arrangement for providing an output signal that has an amplitude which is proportional to the square-root of the amplitude of an input signal. This arrangement is advantageous because it permits the direct use of linear control algorithms to control instruments having non-linear responses.

SUMMARY OF THE INVENTION

In accordance with one aspect of the present invention, an apparatus comprises a sign extractor, a delay, a square root extractor, and a sign restorer. The sign extractor has an input and first and second outputs. The input of the sign extractor receives an input signal, the first output provides a sign of the input signal, and the second output provides a magnitude of the input signal. The delay is coupled to the first output, and the delay imposes a delay on the sign. The square root extractor is coupled to the second output. The square root extractor has an output that provides an output signal, and the output signal is an approximation to a square root of the magnitude of the input signal. The sign restorer is coupled to the output of the square root extractor and to the delay. The sign restorer applies the sign from the delay to the output signal from the square root extractor.

In accordance with another aspect of the present invention, a square root extractor consists of multiplying, summing, scaling, and delaying functions.

In accordance with yet another aspect of the present invention, a square root extractor comprises first, second, and third multipliers, first and second summers, first and second delays, and a scaler. The first multiplier has a first input coupled to receive a signal whose square root is to be extracted and a second input coupled to an output of the third multiplier. The first summer has a first input coupled to an output of the first multiplier and a second input coupled to an output of the first delay. The scaler has an input coupled to an output of the first summer and an output coupled to an input of the first delay. The output of the first delay provides an output of the square root extractor. The second multiplier has a first input coupled to the output of the first delay and a second input coupled to the output of the second delay. The second summer has a first input coupled to an output of the second multiplier and a second input coupled to a constant. The third multiplier has a first input coupled to an output of the second summer and a second input coupled to the output of the second delay. The second delay has an input coupled to the output of the third multiplier.

In accordance with still another aspect of the present invention, a method comprises the following: multiplying first and second signals to produce a third signal, wherein the first signal is a signal whose square root is to be extracted; summing the third signal and a fourth signal to produce a fifth signal; scaling the fifth signal to produce a sixth signal; delaying the sixth signal to produce the fourth signal; multiplying the fourth signal and a seventh signal to produce an eighth signal; subtracting the eighth signal from a constant to produce a ninth signal; multiplying the ninth signal and the seventh signal to produce the second signal; and, delaying the second signal to produce the seventh signal, wherein both the fourth signal and the sixth signal are approximations to the square root of the first signal, and wherein both the second signal and the seventh signal are approximations to the reciprocal of the square root of the first signal. dr

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
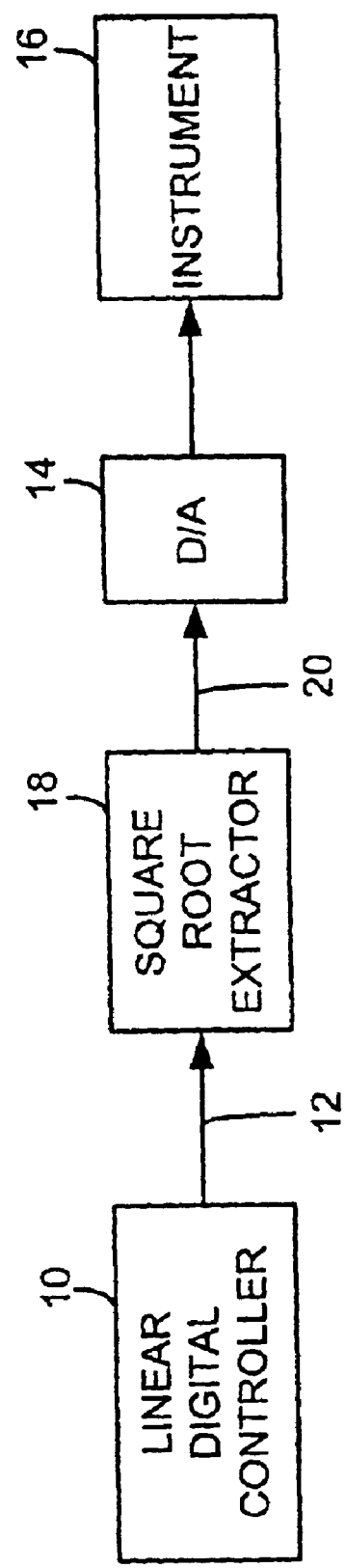
FIG. 1 shows an exemplary operating environment for the square root extractor of the present invention; and, FIG. 2 shows a square root extractor according to one embodiment of the present invention.

As shown in FIG. 1, a linear digital controller 10 generates a signal on an output 12. As is typical, the signal on the output 12 from the linear digital controller 10 may be used to drive an instrument whose response is proportional to this signal. Thus, after digital-to-analog conversion by a digital-to-analog converter 14, this signal can be used directly in many typical linear-control applications. However, if the signal on the output 12 is to be used to drive an instrument 16 whose internal physics provide a responsive force within the instrument that is proportional to the square of the magnitude of the signal on the output 12, a square root extractor 18 is interposed between the linear digital controller 10 and the digital-to-analog converter 14, as shown in FIG. 1. The square root extractor 18 produces a signal on its output 20 that is an approximation of the square root of the magnitude of the signal on the output 12 and carrying the sign of the signal on the output 12.

The square root extractor 18 may be implemented in accordance with the following mathematical analysis. The magnitude of the signal on the output 12 of the linear digital controller 10 may be defined as $|x_n|$ and an approximation of its square root may be defined as $u_n$. The choice of an approximation error function determines the mechanization complexity and the speed of convergence provided by the square root extractor 18. However, to simplify mechanization complexity and increase the speed of convergence, the selected approximation error function may be defined in accordance with the following equation:

$$f(u_n) = u_n^2 - |x_n| \quad (1)$$

The derivative of $f(u_n)$ is then determined in accordance with the following equation:

$$f'(u_n) = 2u_n \quad (2)$$

The zero value for the approximation error function $f(u_n)$ may be computed iteratively using the well known Newton-Raphson update formula from elementary calculus. The Newton-Raphson update formula for u is given by the following equation:

$$u_{n+1} = u_n - \frac{f(u_n)}{f'(u_n)} \quad (3)$$

Substituting equations (1) and (2) into equation (3) produces the following equation:

$$u_{n+1} = \frac{1}{2}\left(u_n + \frac{|x_n|}{u_n}\right) \quad (4)$$

In order to avoid a division step, the method disclosed in K. Martin, "Power-Normalized Update Algorithm for Adaptive Filters Without Division,"*IEEE ASSP Trans.*, vol. 37, no. 11, November 1989; pp. 1782–1786 may be used. According to this method, $1/u_n$ can be approximated as $v_{n+1}$. Substituting $v_{n+1}$ for $1/u_n$ in equation (4) produces the following equation:

$$u_{n+1} = \frac{1}{2}(u_n + |x_n|v_{n+1}) \quad (5)$$

The approximation error function for $v_n$ may be selected in accordance with the following equation:

$$g(v_n) = u_n - \frac{1}{v_n} \quad (6)$$

The derivative of equation (6) is given by the following equation:

$$g'(v_n) = v_n^{-2} \quad (7)$$

The Newton-Raphson update formula for $v_n$ is given by the following equation:

$$v_{n+1} = v_n - \frac{g(v_n)}{g'(v_n)} \quad (8)$$

Substituting equations (6) and (7) into equation (8) produces the following equation:

$$v_{n+1} v_n (2 - u_n v_n) \quad (9)$$

It should be noted that equation (9) is the reciprocator according to the K. Martin paper disclosed above.

Equations (5) and (9) may be implemented as a square root extractor requiring only the simple operations of adding, subtracting, multiplying, and delaying in order to produce an output signal that is the square root of an input signal. Therefore, a square root extractor according to equations (5) and (9) permits the direct use of linear control algorithms to measure observed phenomenon in a simple, straight forward manner.

Because the operation required by equations (5) and (9) is iterative, there are practical bandwidth restrictions in using a square root extractor according to these equations. However, from arbitrary initial conditions (such as $u_0=0$ and $v_0=0.001$), convergence between $u_n$, the square root approximation of $|x_n|$, and the actual square root of $|x_n|$ within parts per billion is achieved in less than a dozen sample periods. When following a well-behaved signal such as a sinusoid, the tracking error is very small.

Figure 2:
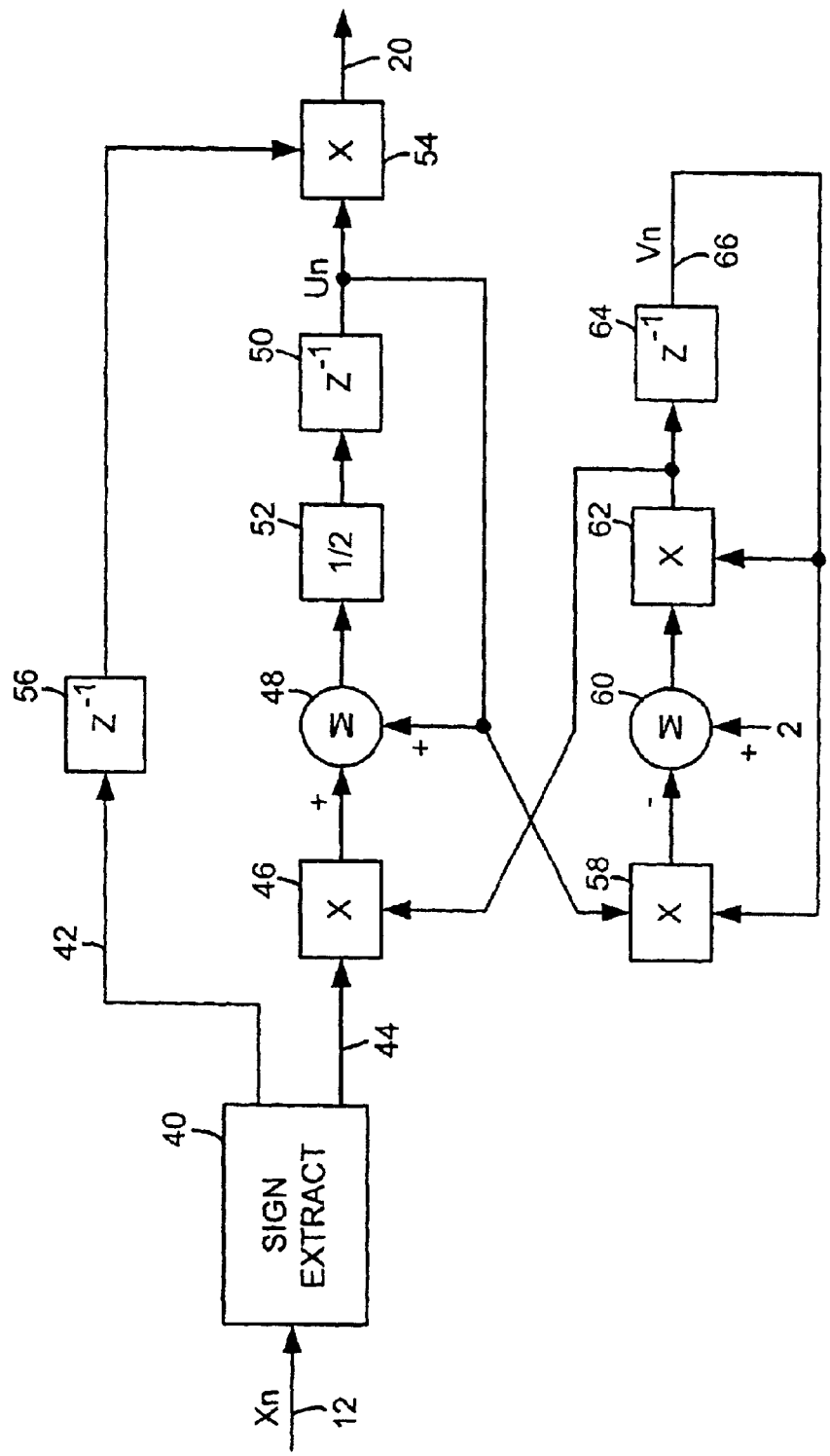

FIG. 2 shows an implementation of the square root extractor 18 in accordance with equations (5) and (9). The signal ($x_n$) on the output 12 of the linear digital controller 10 is coupled to a sign extractor 40 having first and second outputs 42 and 44. The signal on the first output 42 of the sign extractor 40 is the sign of the signal ($x_n$) on the output 12. The signal on the second output 44 of the sign extractor 40 is the magnitude of the signal ($x_n$) on the output 12. That is, the signal on the second output 44 of the sign extractor 40 is the absolute value of the signal ($x_n$) on the output 12. In this regard, the sign extractor 40 may be arranged to complement the signal ($x_n$) and to provide either the signal ($x_n$) or the complement of the signal ($x_n$) on the second output 44 depending on which of the signals ($x_n$) has the positive sign bit.

The second output 44 is coupled to a first input of a first multiplier 46. The signal from the output of the first multiplier 46 is summed by a first summer 48 with a signal produced by a first one-sample-period-delay element 50. The output from the first summer 48 is scaled by ½ by a scaler 52. The output of the scaler 52 is coupled to an input of the first one-sample-period-delay element 50, and the output of the first one-sample-period-delay element 50 is an approximation of the square root of the magnitude of the signal ($x_n$) on the output 12. The output of the first one-sample-period-delay element 50 is provided to a first input of a sign restorer 54. The sign on the output 42 from the sign extractor 40 is delayed by a second one-sample-period-delay element 56 and is coupled to a second input of the sign restorer 54. The sign restorer 54 merely applies the sign from the second one-sample-period-delay element 56 to the output signal at the output of the first one-sample-period-delay element 50. Thus, the signal provided by the sign restorer 54 on the output 20 is an approximation of the square root of the magnitude of the amplitude of the signal ($x_n$) on the output 12 and has the sign of the signal ($x_n$) on the output 12.

The output from the first one-sample-period-delay element 50 is further coupled to a first input of a second multiplier 58. The second multiplier 58 produces an output signal which is coupled to a negative input of a second summer 60. A constant k=2 is provided to a positive input of the second summer 60. The second summer 60, accordingly, subtracts the output of the multiplier 58 from the constant k=2. The second summer 60 produces an output signal which is coupled to a first input of a third multiplier 62. The third multiplier 62 produces an output signal which is coupled to a second input of the first multiplier 46. The output signal from the third multiplier 62 is also delayed by a third one-sample-period-delay element 64. The third one-sample-period-delay element 64 provides a signal on an output 66 which is an approximation of the reciprocal of the square root of the signal at the second output 44 from the sign extractor 40. The output 66 is coupled to second inputs of the second multiplier 58 and the third multiplier 62.

Accordingly, the square root extractor 18 implements equations (5) and (9) to produce an approximation of the square root of the magnitude of the signal on the output 12 from the linear digital controller 10.

Certain modifications of the present invention will occur to those practicing in the art of the present invention. For example, the square root extractor 18 can be a digital square root extractor, as shown and described above, or the square root extractor 18 can be an analog square root extractor. If the square root extractor 18 is an analog square root extractor, it may be desirable to interpose the square root extractor 18 between the digital-to-analog converter 14 and the instrument 16. Alternatively, the square root extractor 18 having an analog form may be used without the digital-to-analog converter 14 in the case where a linear analog controller is used in place of the linear digital controller 10.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A control system comprising:
   a linear controller that outputs a first signal;
   a first multiplier having a first input coupled to receive the first signal;
   a first summer having a first input coupled to an output of the first multiplier;
   a scaler having an input coupled to an output of the first summer;
   a first delay having an input coupled to an output of the scaler and an output coupled to a second input of the first summer, the output of the first delay providing a second signal that is a square root of the first signal;
   a second multiplier having a first input coupled to the output of the first delay;
   a second summer having a first input coupled to an output of the second multiplier and a second input coupled to a constant;
   a third multiplier having a first input coupled to an output of the second summer and an output coupled to a second input of the first multiplier;
   a second delay having an input coupled to an output of the third multiplier and having an output coupled to second inputs of the second and third multipliers; and,
   a non-linear instrument coupled to receive the second signal, wherein the second signal is a pre-distorted form of the first signal such that the non-linear instrument provides a linear output with respect to the first signal.

2. The control system of claim 1 wherein the scaler applies a scaling function substantially equal to one-half.

3. The control system of claim 1 wherein the constant is substantially equal to two.

4. The control system of claim 3 wherein the scaler applies a scaling function substantially equal to one-half.

5. The control system of claim 1 wherein the first input of the first summer comprises a first positive input, wherein the second input of the first summer comprises a second positive input, wherein the first input of the second summer comprises a negative input, and wherein the second input of the second summer comprises a positive input.

6. The control system of claim 5 wherein the scaler applies a scaling function substantially equal to one-half, and wherein the constant is substantially equal to two.

7. The control system of claim 1 further comprising a sign restorer, wherein the sign restorer comprises a signal extractor, a third delay, and a fourth multiplier, wherein the sign extractor provides a sign of the first signal, wherein the third delay imposes a delay on the sign, and wherein the fourth multiplier has a first input coupled to an output of the third delay and a second input coupled to the output of the first delay, and wherein the fourth multiplier has an output coupled to the non-linear instrument.

8. A control system comprising:
   a first multiplier having a first input coupled to receive a first signal;
   a first summer having a first input coupled to an output of the first multiplier;
   a scaler having an input coupled to an output of the first summer;
   a first delay having an input coupled to an output of the scaler and an output coupled to a second input of the first summer, the output of the first delay providing a second signal that is a square root of the first signal;
   a second multiplier having a first input coupled to the output of the first delay;
   a second summer having a first input coupled to an output of the second multiplier and a second input coupled to a constant;
   a third multiplier having a first input coupled to an output of the second summer and an output coupled to a second input of the first multiplier;
   a second delay having an input coupled to an output of the third multiplier and having an output coupled to second inputs of the second and third multipliers; and,
   a non-linear instrument coupled to receive the second signal, wherein the second signal is a pre-distorted form of the first signal such that the non-linear instrument provides a linear output with respect to the first signal.

9. The control system of claim 8 wherein the scaler applies a scaling function substantially equal to one-half.

10. The control system of claim 8 wherein the constant is substantially equal to two.

11. The control system of claim 10 wherein the scaler applies a scaling function substantially equal to one-half.

12. The control system of claim 8 wherein the first input of the first summer comprises a first positive input, wherein the second input of the first summer comprises a second positive input, wherein the first input of the second summer comprises a negative input, and wherein the second input of the second summer comprises a positive input.

13. The control system of claim 12 wherein the scaler applies a scaling function substantially equal to one-half, and wherein the constant is substantially equal to two.

14. The control system of claim 8 further comprising a sign restorer, wherein the sign restorer comprises a signal extractor, a third delay, and a fourth multiplier, wherein the sign extractor provides a sign of the first signal, wherein the third delay imposes a delay on the sign, and wherein the fourth multiplier has a first input coupled to an output of the third delay and a second input coupled to the output of the first delay, and wherein the fourth multiplier has an output coupled to the non-linear instrument.

15. A control system comprising:
   a first multiplier having a first input coupled to receive a first signal;
   a first summer having a first input coupled to an output of the first multiplier;

a scaler having an input coupled to an output of the first summer;

a first delay having an input coupled to an output of the scaler and an output coupled to a second input of the first summer, the output of the first delay providing a second signal that is a square root of the first signal;

a second multiplier having a first input coupled to the output of the first delay;

a second summer having a first input coupled to an output of the second multiplier and a second input coupled to a constant;

a third multiplier having a first input coupled to an output of the second summer and an output coupled to a seconds input of the first multiplier;

a second delay having an input coupled to an output of the third multiplier and having an output coupled to second inputs of the second and third multipliers;

a fourth multiplier having first and second inputs and an output, the first input of the fourth multiplier being coupled to an output of the first delay, the second input of the fourth multiplier receiving a sign of the first signal, and the output of the fourth multiplier providing a third signal that is a square root of the first signal and that has the sign of the first signal; and, a non-linear instrument coupled to receive the third signal, wherein the third signal is a pre-distorted form of the first signal such that the non-linear instrument provides a linear output with respect to the first signal.

16. The control system of claim 15 wherein the scaler applies a scaling function substantially equal to one-half.

17. The control system of claim 15 wherein the constant is substantially equal to two.

18. The control system of claim 17 wherein the scaler applies a scaling function substantially equal to one-half.

19. The control system of claim 15 wherein the first input of the first summer comprises a first positive input, wherein the second input of the first summer comprises a second positive input, wherein the first input of the second summer comprises a negative input, and wherein the second input of the second summer comprises a positive input.

20. The control system of claim 19 wherein the scaler applies a scaling function substantially equal to one-half, and wherein the constant is substantially equal to two.

* * * * *